UNITED STATES PATENT OFFICE.

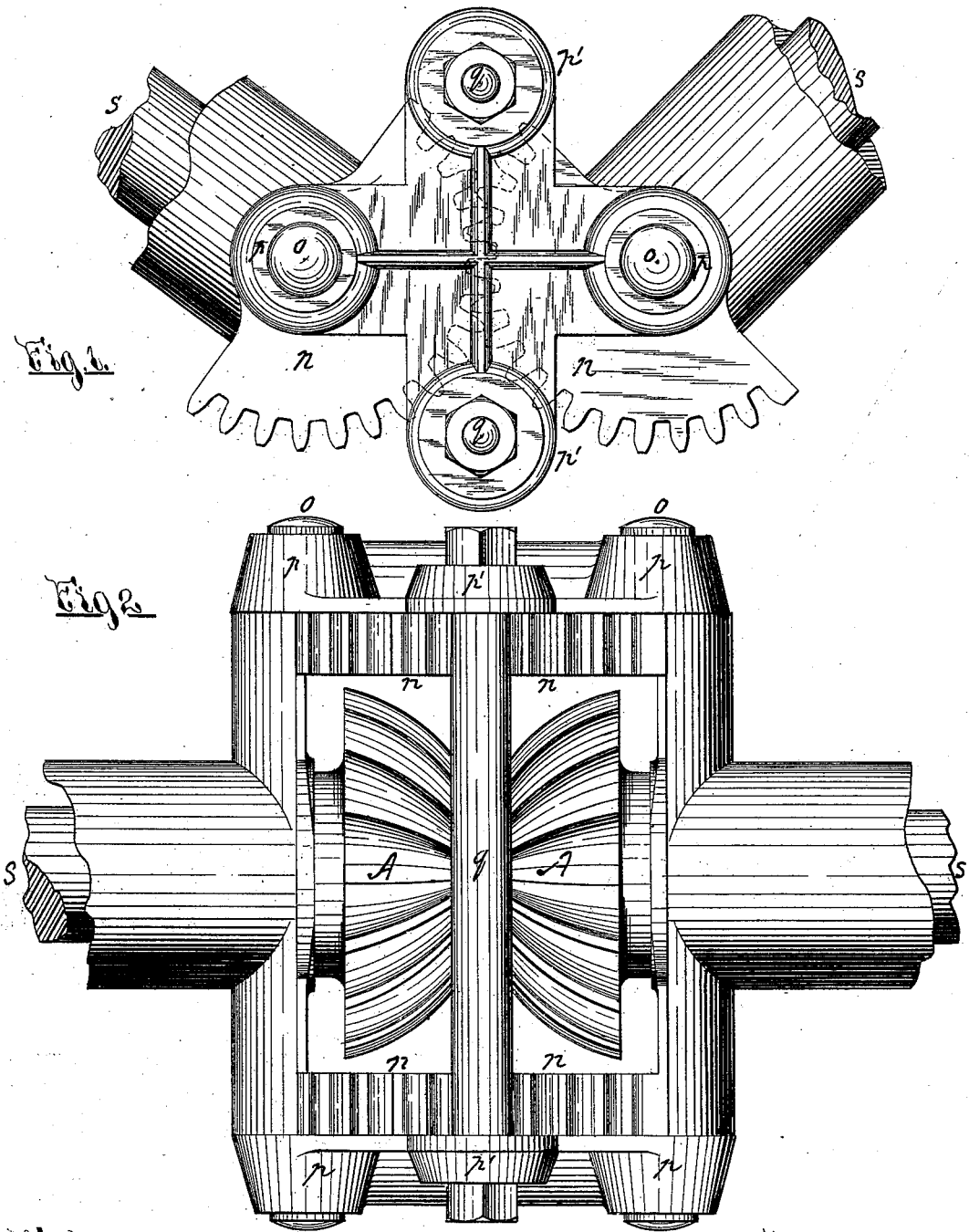

JOHN JAMES GREENOUGH, OF SYRACUSE, NEW YORK.

UNIVERSAL-JOINT GEARING.

SPECIFICATION forming part of Letters Patent No. 357,594, dated February 15, 1887.

Application filed September 15, 1886. Serial No. 213,585. (No model.)

*To all whom it may concern:*

Be it known that I, JOHN JAMES GREENOUGH, of Syracuse, Onondaga county, State of New York, have invented a new and useful Improvement in the Universal-Joint Gearing for Uniting Shafts, patented to me December 16, 1873, No. 145,499, of which the following is a specification.

In my original invention, patented as above named, the segmental couplings for holding the segmental spherical gears in place when mounted upon the shafts relatively to each other are held, as shown and described, by means of links $p$, that extend from one stud or trunnion, $o$, projecting from the face of the segments $n$ on each side, at the center of the pitch-line of the segment, to the trunnion $o$ on the opposite segment, and thus holds the segments $n$ in gear while moving around their entire curve, by which the segmental spherical gear A are kept in gear while revolving the shafts $s$ at any angle or position they may be moved into relatively to each other. While theoretically this device was perfect, it has heretofore been found impossible to construct the joint so as to prevent the spherical gear A from abrading and cutting, by which it was soon destroyed, especially at high velocities or when put to severe strains. To obviate this defect the present improvement was devised to give a steady and rigid support to the segments while allowing them freedom to turn on their trunnions.

The construction of the present device is as follows, referring to the accompanying drawings, in which—

Figure 1 is a plan of my new link. Fig. 2 is a side view of the two links joined by a rod.

The device consists of links $p$, connecting the trunnions $o$ on the segments $n$, to hold the segments in place. These links are formed with projections $p'$ from the center of their length at right angles, forming a cross, as clearly seen at Fig. 1, and extending out beyond the periphery of the segments, with a rod, $q$, extending from the end of each arm $p'$ of the cross to the arm $p'$ of the opposite link, as seen in Fig. 2, by which the segments and links are firmly held in position, with freedom to turn to any angle from a right line, and thus prevent the spherical gears running between them from cutting and wearing out.

Having thus fully described my improvement in universal-joint gear, I claim—

The cross-links $p\ p'$, in combination with the segmental-gear joint for holding said gear properly united while driving shafts at any angle, substantially as herein described.

JOHN JAMES GREENOUGH.

Witnesses:
T. E. HANCOCK,
E. M. BUTLIN.